United States Patent
Castro et al.

(10) Patent No.: US 6,823,053 B2
(45) Date of Patent: Nov. 23, 2004

(54) METHOD AND SYSTEM FOR DISPLAYING CUSTOMER INFORMATION

(75) Inventors: D. Alexis Castro, Fairview Heights, IL (US); Kurt A. Ensminger, Escondido, CA (US); Holly C. Fisher, Loomis, CA (US); Mimi Gizoni, Vista, CA (US); Carolyn M. Jones, Bolingbrook, IL (US); Kurt M. Joseph, Austin, TX (US); Ann G. Lakin, House Springs, MO (US); Gail A. Malaret, Elk Grove Village, IL (US); Hector Martinez, San Leandro, CA (US); Elizabeth Mattingly, Webster Groves, MO (US); Justine X. Moore, Island Lake, IL (US); David Schaefers, Aurora, IL (US); Sheri Schalk, Sunset Hills, MO (US); Traci N. Tyus, Florissant, MO (US); Edward Votoupal, Maryville, IL (US); Carole A. Weidhuner, LaGrange, IL (US); Kevin S. Wilkerson, St. Louis, MO (US); Tammy L. Winter-Patterson, San Ramon, CA (US)

(73) Assignee: SBC Properties, L.P., Reno, NV (US)

( * ) Notice: Subject to any disclaimer, the term of this patent is extended or adjusted under 35 U.S.C. 154(b) by 92 days.

(21) Appl. No.: 10/264,594

(22) Filed: Oct. 3, 2002

(65) Prior Publication Data

US 2004/0066922 A1 Apr. 8, 2004

(51) Int. Cl.$^7$ .................. H04M 15/00; H04M 3/00; H04M 5/00
(52) U.S. Cl. ............. 379/115.01; 379/116; 379/121.02; 379/247; 379/265.02
(58) Field of Search .................. 379/114.02, 115.01, 379/116, 119, 121.02, 121.04, 243, 247, 265.01, 111, 114.01, 114.03, 115.02, 118, 121.01, 122, 265.03, 265.07, 265.09, 265.11, 309

(56) References Cited

U.S. PATENT DOCUMENTS

| | | | | |
|---|---|---|---|---|
| 5,210,789 A | * | 5/1993 | Jeffus et al. ........... | 379/127.01 |
| 5,570,417 A | | 10/1996 | Byers ..................... | 379/115 |
| 5,799,072 A | * | 8/1998 | Vulcan et al. ......... | 379/114.02 |
| 5,862,203 A | * | 1/1999 | Wulkan et al. ........ | 379/114.02 |
| 5,953,406 A | * | 9/1999 | LaRue et al. .......... | 379/265.01 |
| 5,987,118 A | * | 11/1999 | Dickerman et al. .... | 379/265.01 |
| 6,188,761 B1 | * | 2/2001 | Dickerman et al. .... | 379/265.01 |
| 6,349,290 B1 | | 2/2002 | Horowitz et al. ....... | 705/35 |
| 6,362,838 B1 | | 3/2002 | Szlam et al. ............ | 345/762 |
| 6,581,067 B1 | * | 6/2003 | Bjergo et al. .......... | 379/265.01 |
| 6,592,029 B2 | * | 7/2003 | Brikho .................... | 235/379 |

FOREIGN PATENT DOCUMENTS

WO WO 02/03292 A2 1/2002 ........... G06F/17/60

* cited by examiner

*Primary Examiner*—Binh Tieu
(74) *Attorney, Agent, or Firm*—Baker Botts L.L.P.

(57) ABSTRACT

According to one embodiment of the invention, a method for displaying information is provided. The method includes providing an identity information section, a product information section, and a notes section. The method also includes identifying a plurality of categories of transaction information associated with the particular one of the customers. The method also includes displaying, on a same single layout, the identity information section, the product information section, the notes section, a plurality of tabs identifying the respective categories of transaction information, and the window.

62 Claims, 13 Drawing Sheets

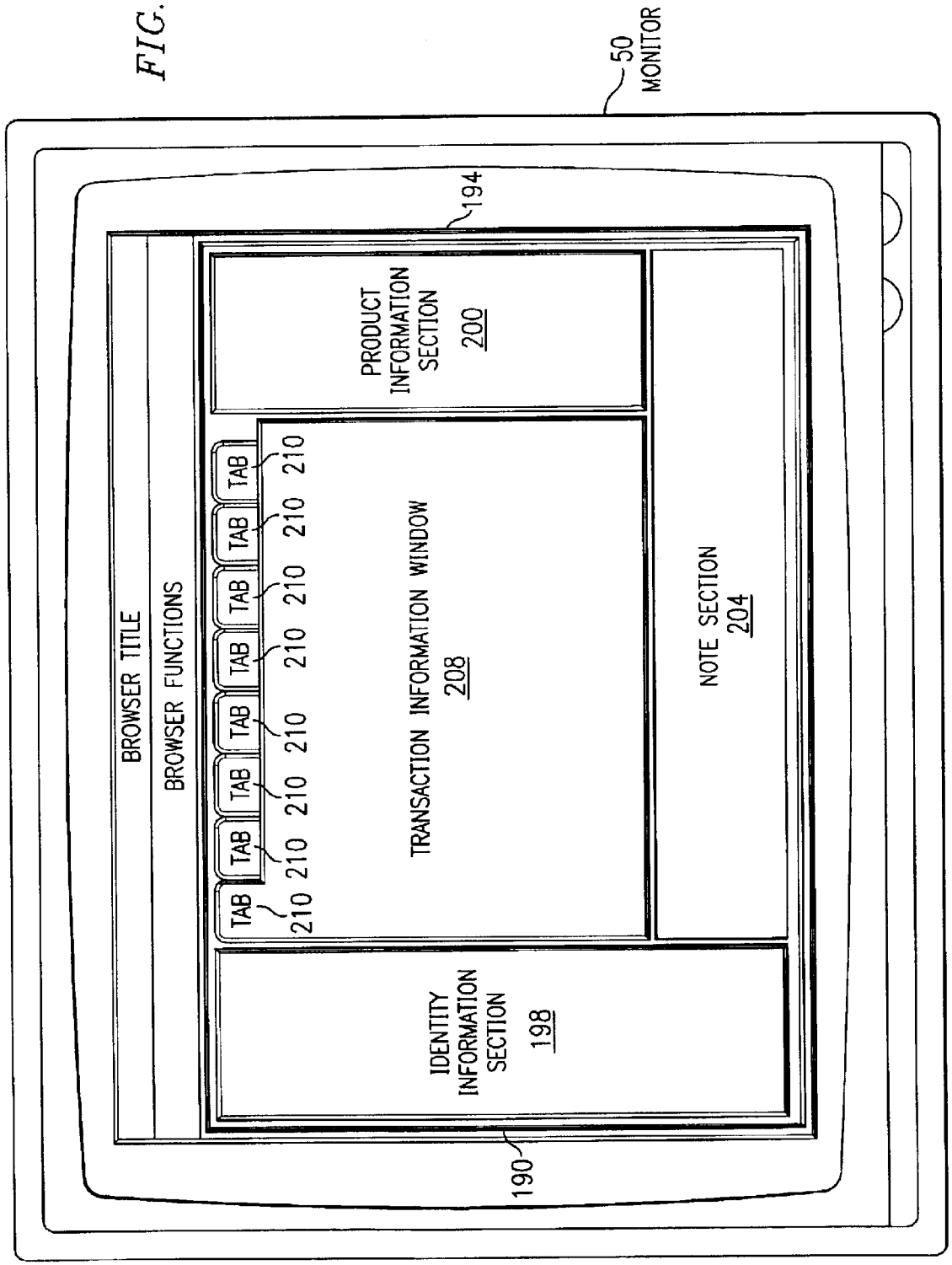

Dashboard 1-555-555-5551-Microsoft Internet Explorer provided by SBC Corporation File  Navigation  Help    198    210  300  210 304  210         208

| Account Information 🖨 ? | Main | Bill | Carriers | 308 |

| Talked With | | | |
| Password | | | |

| Call Date | Call Time | Telephone No. with Customer code |
|---|---|---|
| May 21 | 01:14 PM | ○ 512 346-6158 308 |
| May 20 | 01:17 PM | ○ 512 346-6158 308 |
| May 20 | 09:36 AM | ○ 314 909-8720 761 |
| May 17 | 01:38 PM | ○ 636 938-3933 067 |
| May 17 | 01:36 PM | ○ 512 346-6158 308 |
| May 16 | 03:47 PM | ○ 636 938-3933 067 |
| May 14 | 03:37 PM | ○ 512 346-6158 308 |
| May 14 | 03:34 PM | ○ 636 938-3933 067 |
| May 14 | 02:47 PM | ○ 636 938-3933 067 |
| May 14 | 02:46 PM | ⊙ 918 481-3603 847 |
| May 14 | 02:46 PM | ○ 512 346-6158 308 |

Account Number(s)
123-456-789

Pending Order(s)
"No Pending Orders"  ► Detail

Bill Name and Address/e-Mail
Joe Smith
1234 Main
AUSTIN TX 78750
Joe@abc.com

Service Address
1234 Main
AUSTIN, TX 78750

TO FIG. 7B

| Find Account CSQ-Yes | 318 | Find Account CSQ-No |

318

Alerts

| Complex | Telemarketing |

| Date | Time | Type |
|---|---|---|
| | | |
| 0521 | 01:31P | DASH |
| 0521 | 01:31P | DASH |
| 0228 | 12:46P | CRM |
| 0206 | 01:45P | MASK |
| 0201 | 10:16A | MASK |

| Open Account | Refresh |
| Order System | Go To... |
| Dashboard 2 | |

METHOD AND SYSTEM FOR DISPLAYING CUSTOMER INFORMATION

TECHNICAL FIELD OF THE INVENTION

This invention relates generally to the field of information management and more particularly to a method and system displaying customer information.

BACKGROUND OF THE INVENTION

Many businesses have customer service representatives ("CSR") to respond to the needs of their customers. For a CSR to assist each customer, the CSR may need information concerning the customer. Each category of information may be stored in a separate database that may require the use of a particular software application for access. Thus, each time a CSR assists a customer, the CSR may be required to separately access different categories of information using the corresponding software applications. The software applications may present information differently from one another. Furthermore, each software application may have its own particular set of procedures that must be performed to accomplish a particular task, such as updating information. Thus, CSRs may be required to switch between categories of information, understand different layouts of information and perform tasks by switching from using one set of procedures to another set of procedures to assist a customer.

The inefficiency resulting from these differences is multiplied when a CSR assists hundreds of customers each day. Also, a substantial amount of time and resources may be required to train CSRs to use the variety of software applications to assist customers.

BRIEF DESCRIPTION OF THE DRAWINGS

Reference is now made to the following description taken in conjunction with the accompanying drawings, wherein like reference numbers represent like parts, in which:

FIG. 4 is a schematic diagram illustrating one embodiment of a layout that may be generated using the method of FIG. 3 and displayed using the system of FIG. 2;

FIGS. 7A and 7B are schematic diagrams illustrating one embodiment of the single layout of FIG. 4 displaying contact history information;

DETAILED DESCRIPTION OF EXAMPLE EMBODIMENTS OF THE INVENTION

Embodiments of the invention are best understood by referring to FIGS. 1 through 9 of the drawings, like numerals being used for like and corresponding parts of the various drawings.

Figure 1:
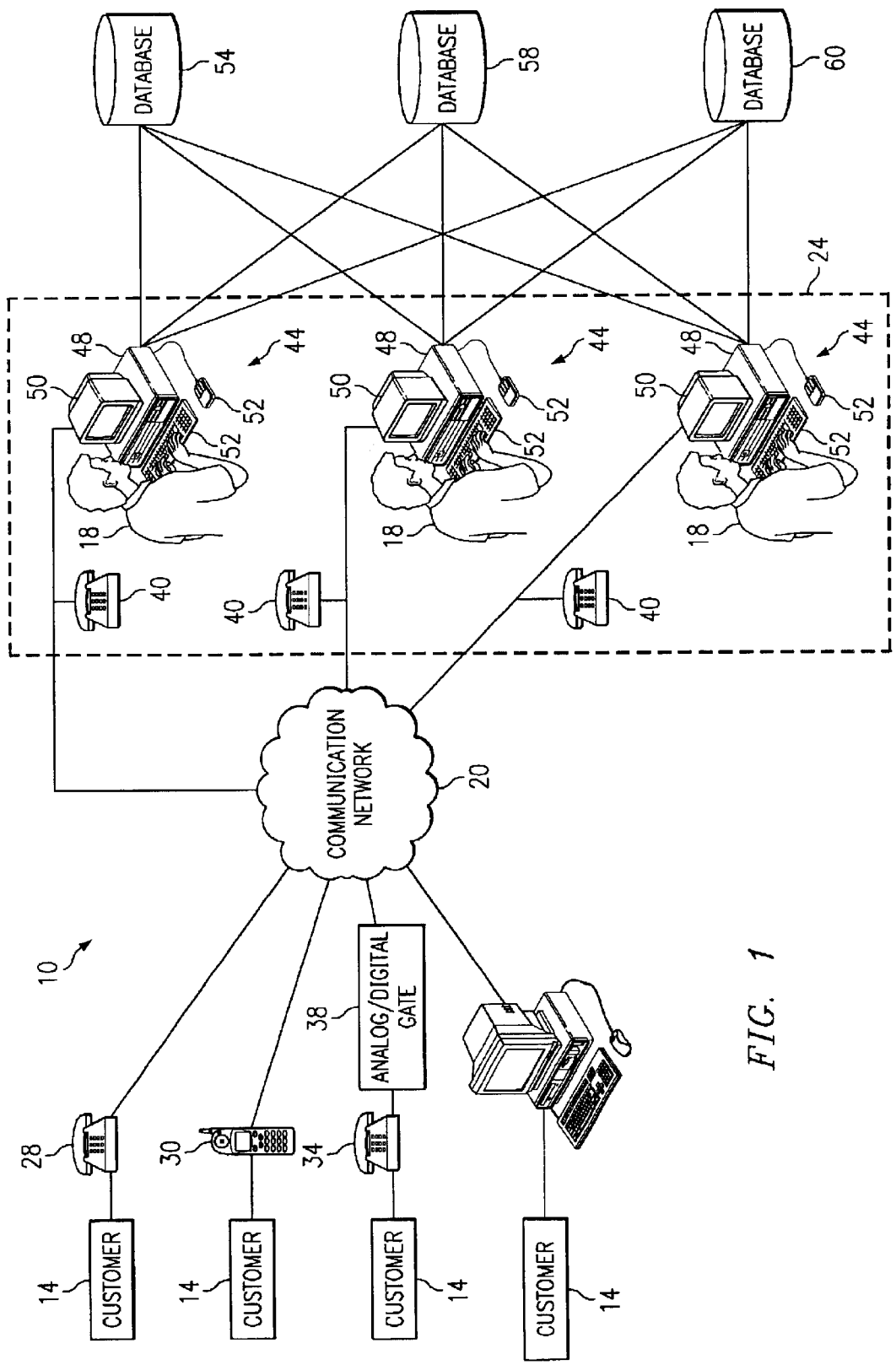
FIG. 1 is a schematic diagram of one embodiment of a communication system that may benefit from the teachings of the present invention.

FIG. 1 illustrates a schematic diagram of an embodiment of a system 10 that may benefit from the teachings of the present invention. System 10 allows a plurality of customers 14 to communicate with a plurality of customer service representatives ("CSRs") 18 over a communication network 20. CSRs 18 assist customers 14 on behalf of one or more businesses, such as a telephone service provider. CSRs 18 may be located in one or more call centers, such as a call center 24 shown as a phantom box in FIG. 1. Customers 14 may contact one or more CSRs 18 using any suitable communication device, such as a telephone 28, a wireless phone 30, a Voice Over Internet Protocol ("VoIP") phone 34, or a computer 36. Certain communication devices may require more or less supporting devices. For example, VoIP phone 34 may require a digital-to-analog/analog-to-digital gate 38 to communicate over any portion of communication network 20 that is a Plain Old Telephone Network ("POTS"). Communication network 20 may be any communication network that is operable to carry communication signals. For example, communication network 20 may be a telephone network, internet, digital network, an optical network, a cable network, or any combination of these and other examples.

Any one of CSRs 18 may initiate a contact with or be contacted by any one of customers 14. For example, CSR 18 may answer a call from a particular customer 14 using a telephone 40 that is accessible to CSR 18. To conduct a transaction, CSR 18 may use a computer system 44 to access any necessary information. Some embodiments of computer system 44 comprises a computer 48, a display unit 50, and one or more input devices 52, such as a mouse 52 or a keyboard 52. Computer system 44 may also have a communication device (not explicitly shown), such as a modem, for interfacing with communication network 20 and/or accessing customer information from one or more databases that are stored in one or more data storage units 54, 58, and 60. In some embodiments, data storage units 54, 58, and 60 may store information concerning customers' 14 long distance service, billing information, and history of contacts with CSR 18, respectively; however, more or less data storage units may be used to store other categories of information. Furthermore, other categories of information may be stored in databases 54, 58, and 60.

For each customer 14 that CSR 18 assists, CSR 18 conventionally accesses several categories of customer information pertaining to the particular customer 14 and the particular transaction at hand. For example, if CSR 18 is assisting customer 14 on behalf of a telephone service provider regarding a billing question, CSR 18 may access following categories of information: Customer 14's identity information, account information, billing history, prior contact information, existing product information, and new product information. CSR 18 may access these categories of information using several software applications that may be stored in computer 48. For example, access to information concerning a service order, which may be stored as a data file or a flat file, may require the use of a software application such as a Service Order Retrieval and Distribution application or a Southwest Order Retrieval and Distribution application. In response to the commands of CSR 18, computer 48 may execute the appropriate applications to retrieve the corresponding categories of information from the appropriate data storage units 54, 58, and/or 60, and display the categories of information through display unit 50.

Conventionally, the categories of information displayed through display unit 50 are presented in various formats. For example, the application that is used to view billing information may display the relevant dates on the left side of the screen, while the application that displays contact history information may display the relevant dates on the top of the screen. Each application displaying a particular category of information may also require a particular set of procedures to be performed for functions that may be common for all categories of information, such as updating information and navigating through sub-categories of information. For example, the application for accessing contact history information may require the use of short cut keys located on keyboard 52 to update any contact information, while the application for accessing billing information may require the use of mouse 52 to select certain buttons that are displayed on display unit 50 to update any billing information. An application may also require CSR 18 to open several windows to view the necessary information. In many cases, these windows may overlap, which makes it cumbersome for CSR 18 to view the category of information in its entirety. Because of these differences between applications, the cumbersome layout of information and the number of applications needed to access different categories of information, CSR 18 may spend a substantial amount of time switching from application to application, window to window, and performing associated functions. CSR 18 is also likely to make more errors because information access is cumbersome. Furthermore, a substantial amount of time and resources is required to train CSRs 18 to use each application for accessing information.

Figure 2:
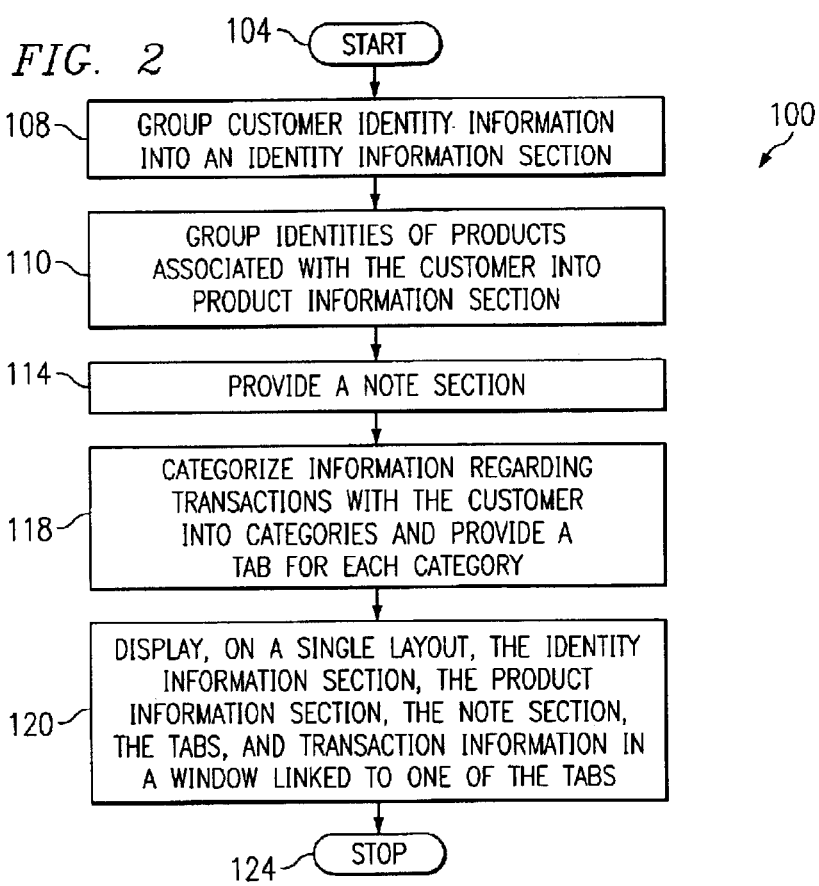
FIG. 2 is a flowchart of one embodiment of a method for displaying information.
Figure 3:
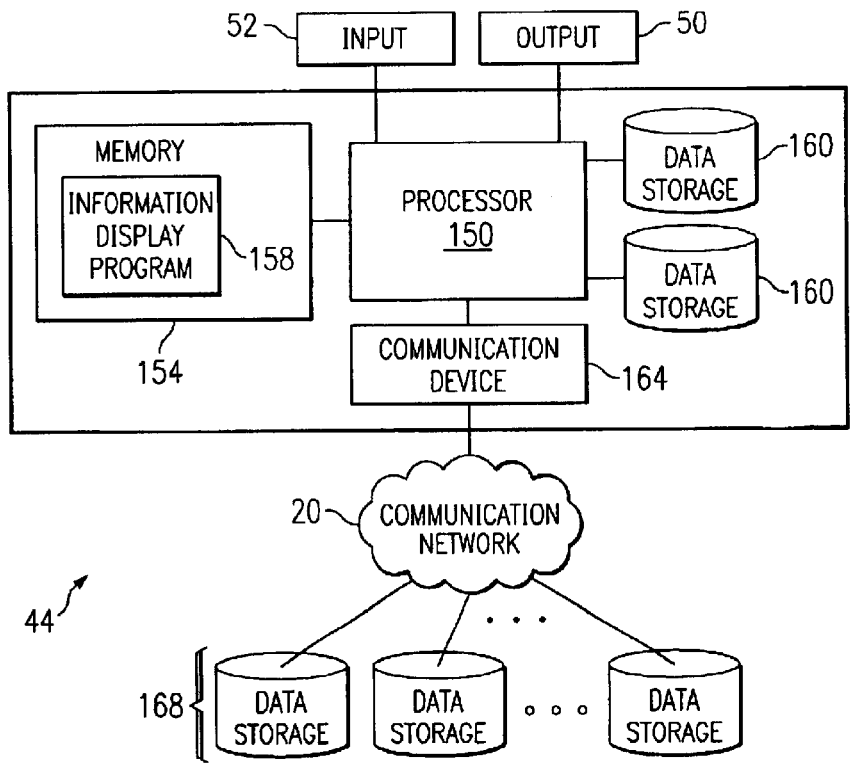
FIG. 3 is a block diagram of one embodiment of a computer system shown in FIG. 1.

According to some embodiments of the present invention, a method and system are provided that allow various categories of information to be displayed on a same single layout. This is advantageous in some embodiments of the invention because the amount of resources required to train CSRs 18 is reduced by consolidating and centralizing customer information into a same single layout. According to another embodiment, the time required to assist a customer is reduced because the time required for accessing and comprehending various categories of information is reduced. According to another embodiment, customer assistance is made easier and faster by using a single application to display multiple categories of information, which eliminates the need to switch from one application to another to access different categories of information. According to another embodiment, customer assistance is made easier and faster by making the history of contacts with a customer readily available. According to another embodiment, customer assistance is made easier and faster by making information concerning communications service providers of a customer readily available. Additional details of example embodiments of the invention are described in greater detail below in conjunction with FIGS. 2 through 9. FIG. 1 is a schematic diagram of one embodiment of a communication system. FIG. 2 is a flowchart of one embodiment of a method for displaying information. FIG. 3 is a block diagram of one embodiment of a computer system that may be used to perform the method of FIG. 2. FIG. 4 is a schematic diagram illustrating one embodiment of a layout that may be generated using the method of FIG. 3 and displayed using the system of FIG. 2. FIGS. 5A through 9B are schematic diagrams illustrating various embodiments of the single layout of FIG. 4.

FIG. 2 is a flow chart of a method 100 for displaying customer information for a CSR assisting a customer on behalf of a communications service provider, such as a telephone service provider or an internet service provider. In one embodiment, method 100 may be performed by a computer system 44, described in detail below in conjunction with FIG. 3; however, other suitable devices may be used to perform some or all of the acts of method 100. Method 100 starts at step 104. At step 108, customer identity information is grouped into an identity information section. One embodiment of an identity information section is described below in conjunction with FIG. 4. Customer identity information may be any information that identifies a particular customer 14. For example, customer identity information may comprise an account number of an account associated with customer 14, customer's 14 name, address, e-mail address, service address, billing address, social security number, date of birth, names of family members, or other information that may identify customer 14. An identity information section, which is shown in FIGS. 4 through 9, may be any identifiable portion of a single layout that may display the customer identity information. An embodiment of a single layout is described below in conjunction with FIG. 4.

At step 110, identities of products that are associated with customer 14 are grouped into a product information section. One embodiment of a product information section is described below in conjunction with FIG. 4. A "product" refers to any product or service, tangible or intangible. A product associated with customer 14 may include caller identification ("Caller ID"), call waiting, favorable rate packages depending on the particular usage pattern of customer 14, or any other products and services provided to customer 14. In some embodiments, product information section may also include identities of products not currently provided to customer 14, but may be suitable for or of interest to customer 14. For example, call waiting service may be identified as a suitable product to provide customer 14 if it is determined that customer 14 has numerous family members but only one phone line; other methods of identifying the particular needs of customer 14 may be used to identify suitable products for customer 14. A product information section may be any identifiable portion of a single layout that may display identities of products associated with customer 14.

At step 114, a notes section is provided. In some embodiments, a notes section comprises an area where CSR 18 may enter notes about a particular transaction concerning customer 14. In one embodiment, the notes section may include previous notes and the corresponding time and date stamps of the notes. One embodiment of a notes section is described below in conjunction with FIG. 4.

At step 118, information concerning any transactions with customer 14 is categorized into a plurality of categories. In some embodiments, a corresponding plurality of identification tabs may be provided. When CSR 18 selects a particular tab, which is displayed with a group of tabs in the single layout, the associated categorized information identified by the tab is displayed through a window. Some embodiments of the tabs and the window are described below in conjunction with FIG. 4. At step 120, the identity information section, the product information section, the notes section, the tabs, and the window operable to display a selected category of transaction information are displayed in a same single layout. One embodiment of a same single layout is described below in conjunction with FIG. 4. The method concludes at step 124.

FIG. 3 is a block diagram illustrating one embodiment of computer system 44 shown in FIG. 1. In one embodiment, computer system 44 may be used to perform some embodiments of method 100 shown in FIG. 2. Computer system 44 comprises a processor 150, a memory 154 storing an information display program 158, and one or more local data storage units 160 for storing data related to program 158 or other data. Computer system 44 may also comprise a communication device 164, such as a modem or other suitable network interface device. Processor 150 is coupled to memory 154, local data storage units 160, and one or more remote data storage units 168 over communication device 164 and communication network 20. Processor 150 is also coupled to output unit 50 and input unit 52. Processor 150 is operable to execute the logic of information display program 158 and access any data storage units 160 and 168 to retrieve or store data relating to information concerning customers 14. Examples of processor 150 are the Pentium™ series processors, available from Intel Corporation.

Memory 154 and data storage units 160 and 168 may comprise files, databases, or other suitable forms of data. Memory 154 and data storage units 160 and 168 may be random access memory, read only memory, CD-ROM, removable memory devices, or any other suitable devices that allow storage and/or retrieval of data. Memory 154 and data storage units 160 and 168 may be interchangeable and may perform the same functions.

Information display program 158 is a computer program that allows CSR 18 to view multiple categories of customer information on a same single layout. The single layout of information may be displayed by output unit 50, such as a monitor 50. In some embodiments, program 158 is operable to perform some or all of the acts of some embodiments of method 100 shown in FIG. 2 to generate and display a single layout of customer information. In one embodiment, program 158 may be operable to access several categories of data from one or more databases stored in different locations and display the data as a same single layout. In some embodiments, program 158 may be operable to display the same single layout as a web site shown through a window of a web browser. An example of program 158 that may incorporate some embodiments of the present invention is Dashboard, available from SBC technology.

Information display program 158 may reside in any storage medium, such as memory 154, data storage unit 160, data storage units 168. Program 158 may also reside in data storage units of other computers, such as a hard disk drive of a remotely located web server. Although FIG. 3 shows program 158 as a software program, program 158 may also be programmed in a variety of hardware, such as a digital signal processor, application specific integrated circuit, or other suitable hardware. Information display program 158 may be written in any suitable language, including C, C++, or any version of Hypertext Markup Language ("HTML").

FIG. 4 is a schematic diagram illustrating one embodiment of a same single layout 190 that may be generated and displayed using computer system 44 and method 100. In one embodiment of the invention, single layout 190 is displayed as a web site that is viewable through a web browser window 194; however, single layout 190 may have an appearance of any information layout generated by any web-based or client-based application. An example of web browser 194 is any version of Microsoft Internet Explorer™, available from Microsoft corporation. Layout 190 comprises an identity information section 198, a product information section 200, a notes section 204, a window 208 for displaying various categories of transaction information, and a plurality of tabs 210 that respectively identify the various categories of transaction information. As shown by FIG. 4, identity information section 198, product information section 200, notes section 204, window 208, and tabs 210 are all arranged within the same single layout 190. In one embodiment shown in FIG. 4, identity information section 198 and product information section 200 are positioned at the sides of layout 190. Notes section 204 is positioned at the bottom of layout 190. Window 208 is positioned immediately above notes section 204. Tabs 210 are positioned immediately above window 208. However, sections 198, 200, and 204, as well as window 208 and tabs 210, may be positioned in other suitable locations within layout 190 based on the different preferences of CSRs 18. For example, identity information section 198 may be positioned immediately above tabs 210 instead of a side of layout 190. The size, color, borders, and other characteristics of identity information section 198, product information section 200, notes section 204, window 208, and tabs 210 may also vary, depending on the preferences of a viewer, such as CSR 18.

As described in conjunction with method 100, one embodiment of identity information section 198 comprises information that identifies a particular customer 14. Identity information section 198 may also comprise links to information that may identify a particular customer 14. A "link" refers to a hyperlink or any other displayed item that, when selected by CSR 18, initiates the display of any associated information or functionality. The information may be displayed as a pop-up window, a flag, a tag, or in any other suitable form.

Links may also have certain functions associated with them. For example, a displayed button, when selected, may enable CSR 18 to update the displayed information. In some embodiments, all functions associated with all information may be performed using links. For example, updating information for any category of information may only require the selection of a "update" link displayed along with the particular category of displayed information. The selection of "update" link may prompt the display of a pop-up window that guides CSR 18 through any update of the displayed category of information. This is advantageous in some embodiments because CSR 18 is not required to use different procedures to perform functions that are common for all categories of information.

Product information section 200 comprises information and/or links to information that may identify the products that are associated with the particular customer 14. Notes section 204 comprises notes and/or links to notes concerning the particular customer 14. Window 208 displays a particular category of transaction information that is identified by one of tabs 210 selected by CSR 18. In some embodiments, window 208 may display links to other information associated with the displayed information.

Figure 5A:
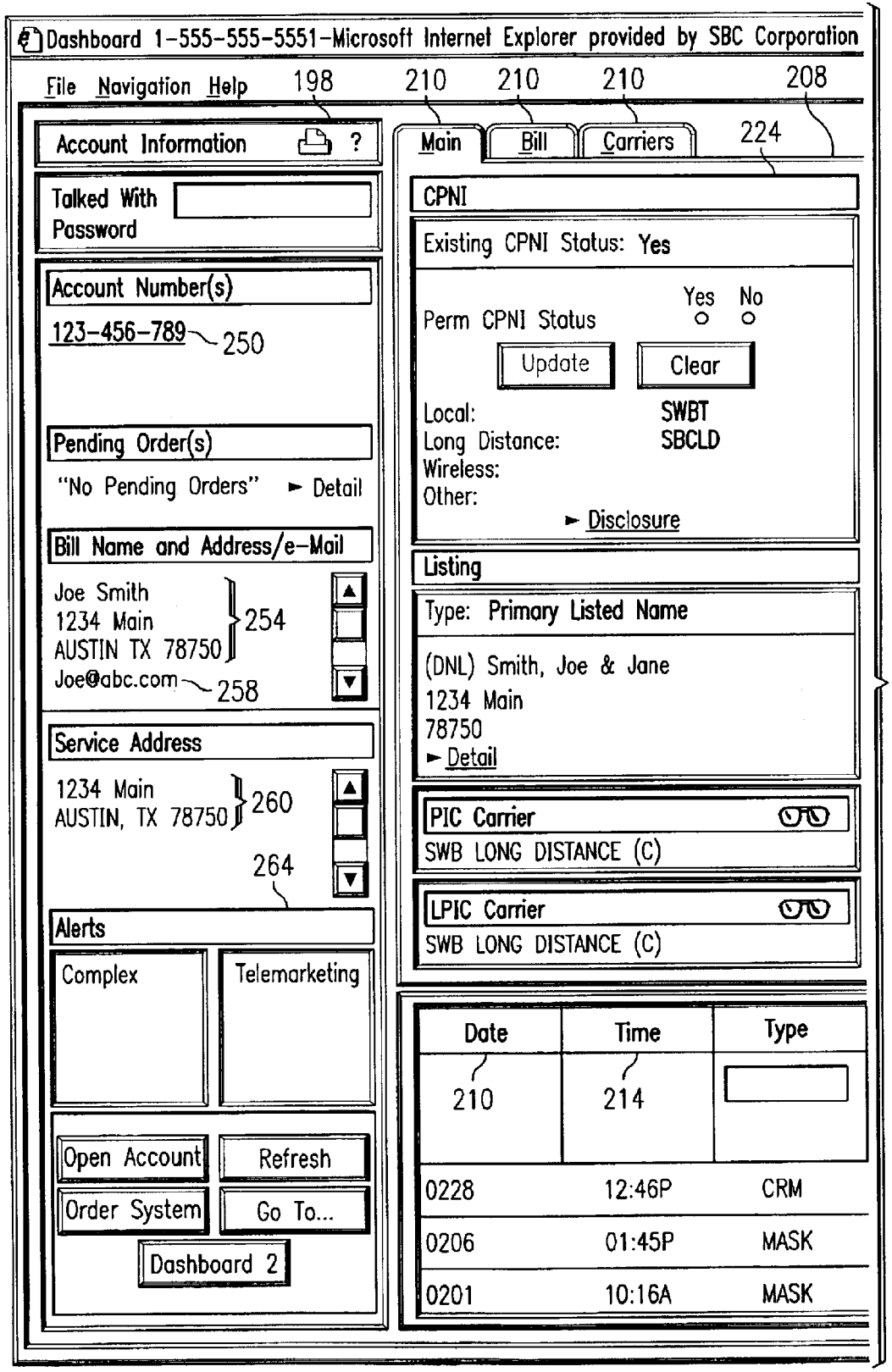
FIGS. 5A and 5B are schematic diagrams illustrating one embodiment of the single layout of FIG. 4 displaying introductory information concerning a customer.
Figure 5B:
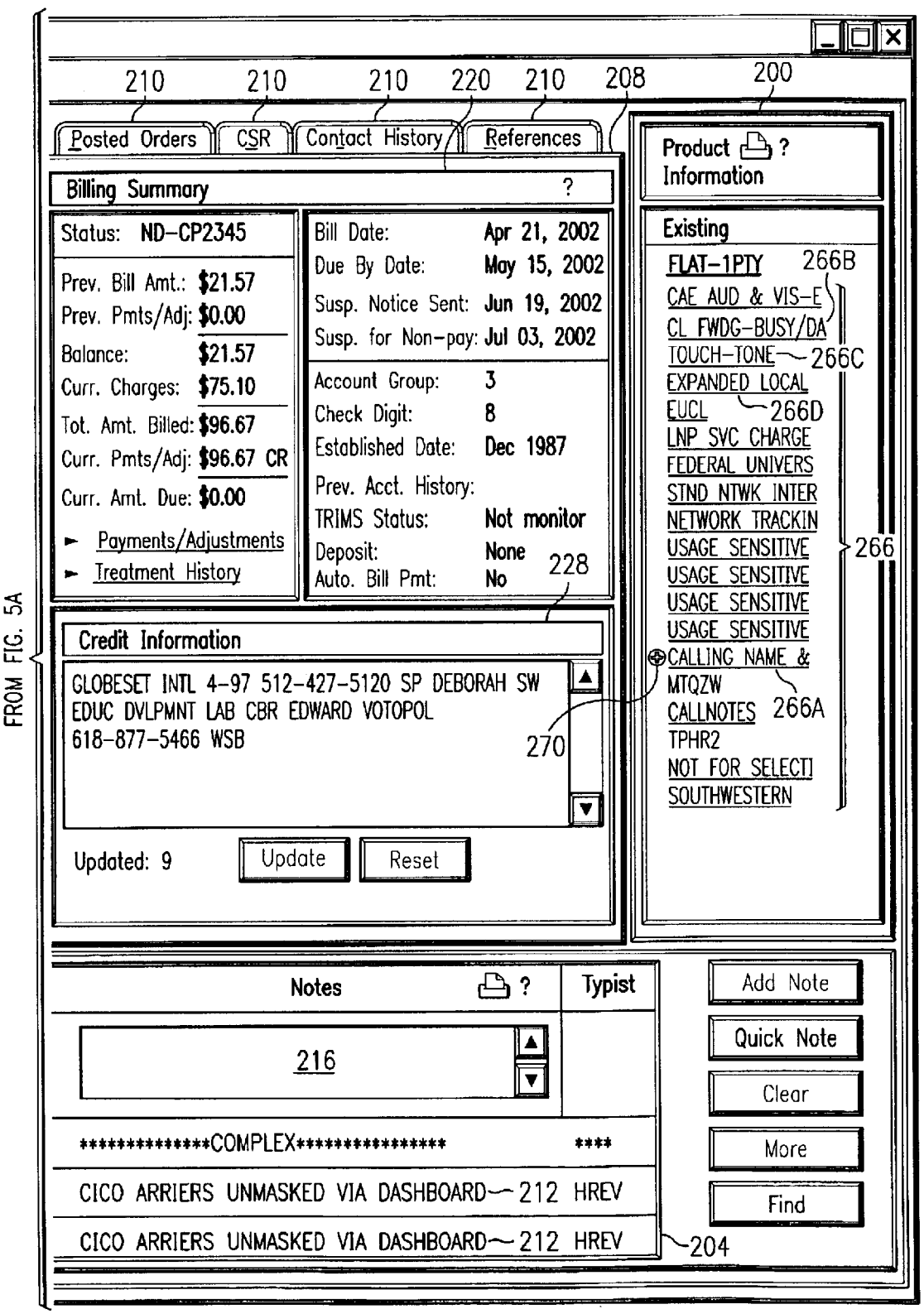

FIGS. 5A and 5B are schematic diagrams illustrating one embodiment of layout 190. In one embodiment, identity information section 198 includes one or more account numbers 250 for customer 14, a billing name and address 254, an e-mail address 258, a service address 260, and a section 264 for any flagged or alert information. For example, section 264 may comprise information regarding whether customer 14 requested a block on telemarketing calls. In one embodiment, product information section 200 comprises one or more identities 266 of products that are provided to customer 14. For example, as shown in FIG. 5B, identities 266 of products in product information section 200 includes caller ID 266A, call forwarding 266B, touch tone dialing 266C, expanded local service 266D, and other products 266 that are provided to customer 14. In one embodiment, product information section 200 also comprises an indicator 270, which displays either a "+" or a "−" sign. Indicator 270 having a "+" sign indicates that the identified product associated with the "+" sign has subcategories that are not currently displayed. For example, in the embodiment shown in FIG. 5B, indicator 270 is showing a "+" sign next to caller ID 266A, which indicates that caller ID 266A has several associated products or features that are not displayed. If indicator 270 were showing a "−" sign next to caller ID 266A, indicator 270 is indicating that the subcategory products are currently displayed, as shown in FIG. 6B. In one embodiment, subcategories of identified product may be displayed when CSR 18 selects indicator 270 showing a "+" sign using input device 52. In one embodiment displayed subcategories of identified product may be hidden when CSR 18 selects indicator 270 showing a "−" sign using input device 52.

In some embodiments, notes section 204 comprises a window 216 where notes concerning customer 14 may be entered. In one embodiment, notes section 204 may also comprise columns 210 and 214 for displaying the corresponding dates and times of displayed notes 212.

In one embodiment, window 208, as shown in FIGS. 5A and 5B, displays a category of transaction information that is identified by selected tab 210. CSR 18 may select one of the displayed tabs 210 using input device 52 to view the category of information identified by the selected tab 210. For example, as shown in FIGS. 5A and 5B, a category of transaction information identified as "Main" by one of tabs 210 comprises information on billing summary 220, customer proprietary network information ("CPNI") 224, any information relevant to the creditworthiness of customer 14, as shown in a credit information section 228, and other information. "Main" category information shown in window 208 may include a variety of other introductory information about customer 14, as shown in FIGS. 5A and 5B; however, more or less introductory information about customer 14 may be included in the category of transaction information identified as "Main."

In some embodiments, as shown in FIGS. 5A and 5B, other categories of transaction information are identified by tabs 210 as "Bill," "Carriers," "Posted Orders," "CSR," "Contact History," and "References." The "Bill" category may comprise detailed information on the bills of customer 14. The "Carriers" category may comprise detailed information on long-distance/local carriers, to the extent that is allowed by any applicable local, state and federal laws. Where necessary, identities and other relevant information concerning local/long distance communication may be masked. If the information is needed to assist a particular customer 14, then CSR 18 may be given an option to unmask the information; however, if the information is unmasked, CSR 18 is prohibited from offering a different local/long distance communication service to the particular customer 14. The "Posted Orders" category may comprise detailed information on any pending or completed services and/or product orders. The "CSR" category may comprise detailed information on products and services selected by customer 14, and customer information for customer 14. The "Contact History" category may comprise detailed information on the history of contacts with customer 14. The "References" category may comprise reference information or links to such information for CSRs 18. Compared to the number of tabs 210 shown in FIGS. 5A and 5B, more or less tabs 210 identifying categories of transaction information may be displayed in layout 190. In some embodiments, more, less, or different information may be available in the respective categories of information identified by tabs 210.

In some embodiments of the invention, single layout 190 may display only those tabs 210 that identify the categories of information that are frequently used or most likely to be used. For example, if computer system 44 is used by CSR 18 who handles billing inquiries of customers 14, then layout 190 may display only tabs 210 that identify those categories of information that a billing inquiry CSR 18 is likely to use, such as the "Main" category, "Bill" category, "Carriers" category, "Contact History" category, and "References" category. This is advantageous in some embodiments of the invention because the choice of available information is strategically reduced, which reduces the level of confusion and distraction for CSRs 18.

Figure 6A:
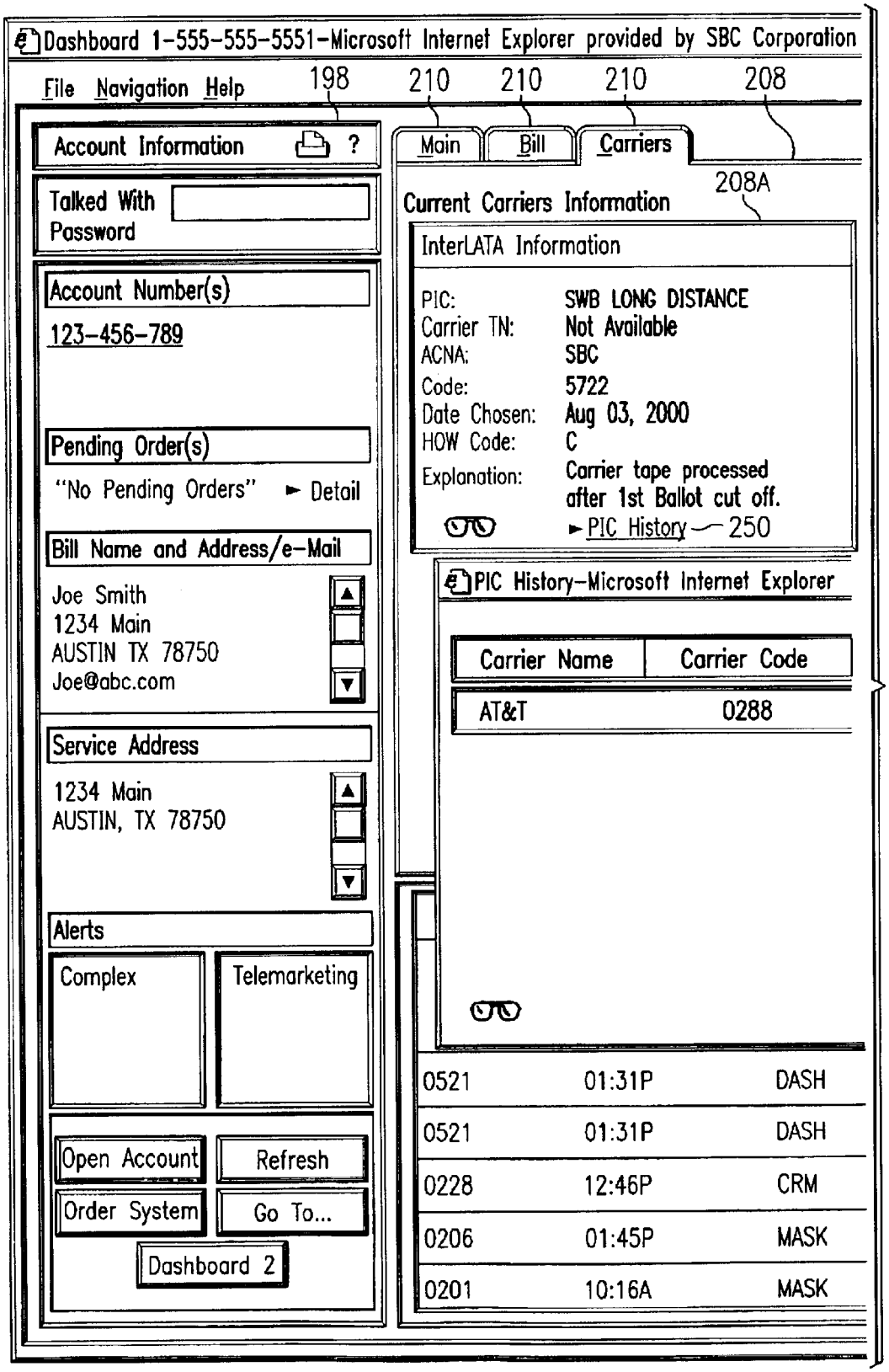
FIGS. 6A and 6B are schematic diagrams illustrating one embodiment of the single layout of FIG. 4 displaying communications carrier information.
Figure 6B:
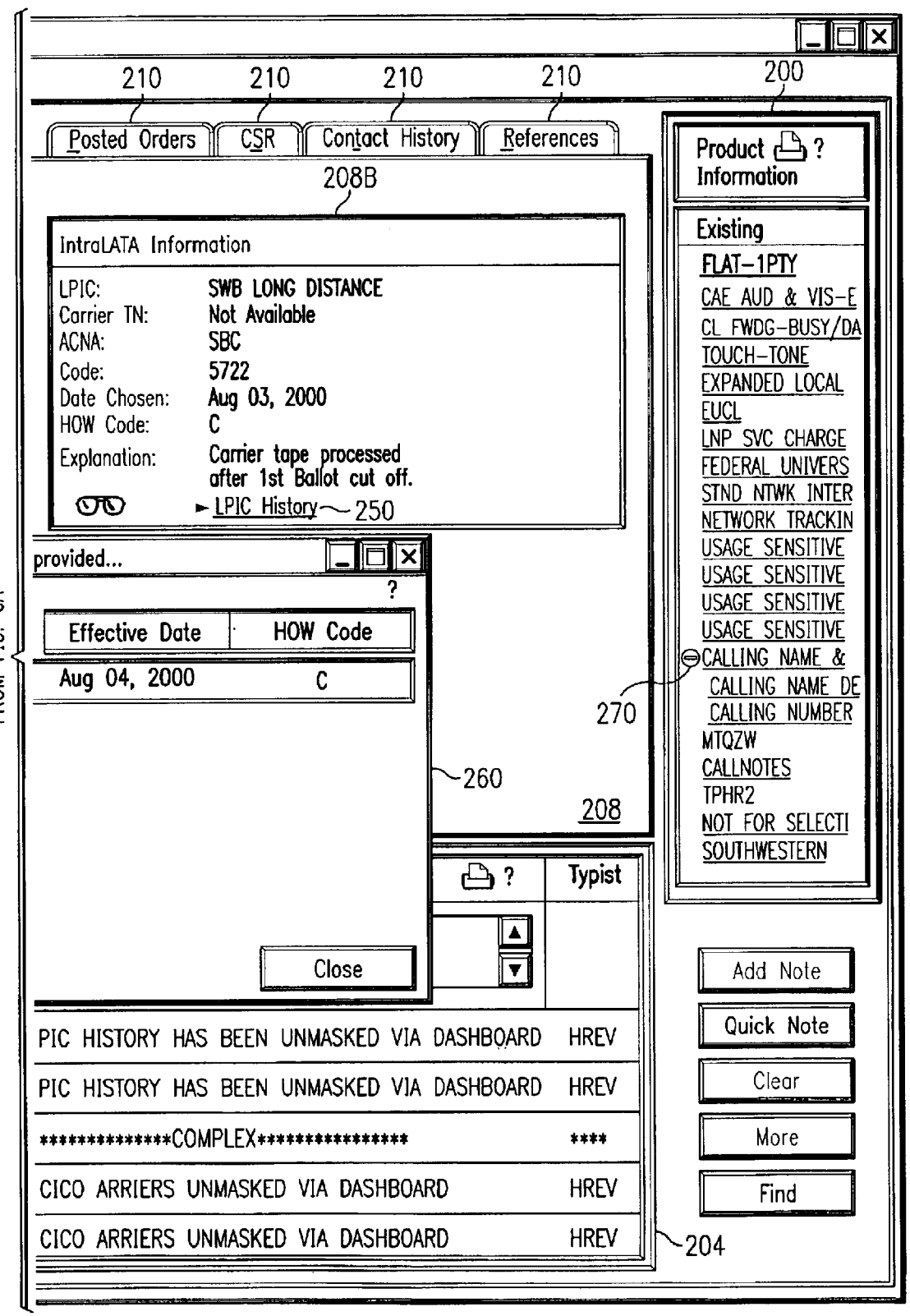

FIGS. 6A and 6B are schematic diagrams illustrating one embodiment of single layout 190 shown in FIG. 4. FIGS. 6A and 6B show window 208 displaying a category of transaction information identified as "Carriers" by one of tabs 210. In some embodiments, although window 208 may switch from displaying one category of transaction information to another, such as displaying the "Main" category of transaction information to displaying the "Carriers" category of transaction information, identity information section 198, product information section 200, and notes section 204 do not change positions and remain displayed in the same respective positions of layout 190. This is advantageous in some embodiments of the invention because identity information section 198, product information section 200, and notes section 204 display information that is often referred to by CSR 18. However, other types of information may also remain displayed in a same position depending on the preference of a viewer, such as CSR 18.

As shown in FIGS. 6A and 6B, the "Carriers" category of transaction information shown through window 208 comprises information concerning communication service providers of customer 14. In some embodiments, window 208 may display separate sub-windows, such as sub-window 208A and 208B. As shown in FIG. 6A, in sub-window 208A, information concerning a long distance telephone service provider associated with customer 14, including the identity of the long-distance telephone service provider, the date that the long-distance provider was chosen, and other relevant information, is included. Sub-window 208B shows information concerning a local telephone service provider associated with customer 14 and may also include analogous types of information as those shown in sub-window 208A. In some embodiments, information in both sub-windows 208A and 208B may be displayed in a single window. In some embodiments, sub-window 208A may also include one or more links 250 to information related to the identified long-distance telephone service provider. For example, as shown in FIG. 6A, a link 250 identified as "PIC History" is displayed in sub-window 208A and associated with information on the history of customer's 14 long-distance communication service providers. As shown in FIG. 6B, sub-window 208B displays a link 250 identified as "LPIC History," which is associated with information on the history of customer's 14 local communication service providers. There may be more than one link 250 in either sub-windows 208A or 208B. If CSR 18 selects link 250 identified as "PIC History," program 158 is operable to display a separate window 260; however, program 158 may be operable to display the associated information using other suitable methods. As shown in FIGS. 6A and 6B, in one embodiment, window 260 displays information on the identities of past communication service providers of customer 14, any pertinent information associated with the identified service providers, effective date, and how a particular communication service provider was selected by customer 14. Link 250 identified as "LPIC History," when selected, may trigger program 158 to display another pop-up window that displays analogous types of information as those of pop-up window 260. More, less, or other types of information on communications service provider may be displayed when "Carriers" tab 210 or links 250 is selected, in some embodiments. Due to the requirements imposed on a communications service provider by local, state, or federal laws, portions of the information in the "Carrier" category may be masked. However, CSR 18 may be given access to the masked information to assist customer 18, providing that CSR 18 follows certain legal guidelines in conducting the transaction with the customer 14. Additionally, FIG. 6B shows sub-categories of caller ID in product information section 200. Because product information section 200 is now showing the sub-categories of an identified product, indicator 270 is displayed as a sign.

Figure 7B:
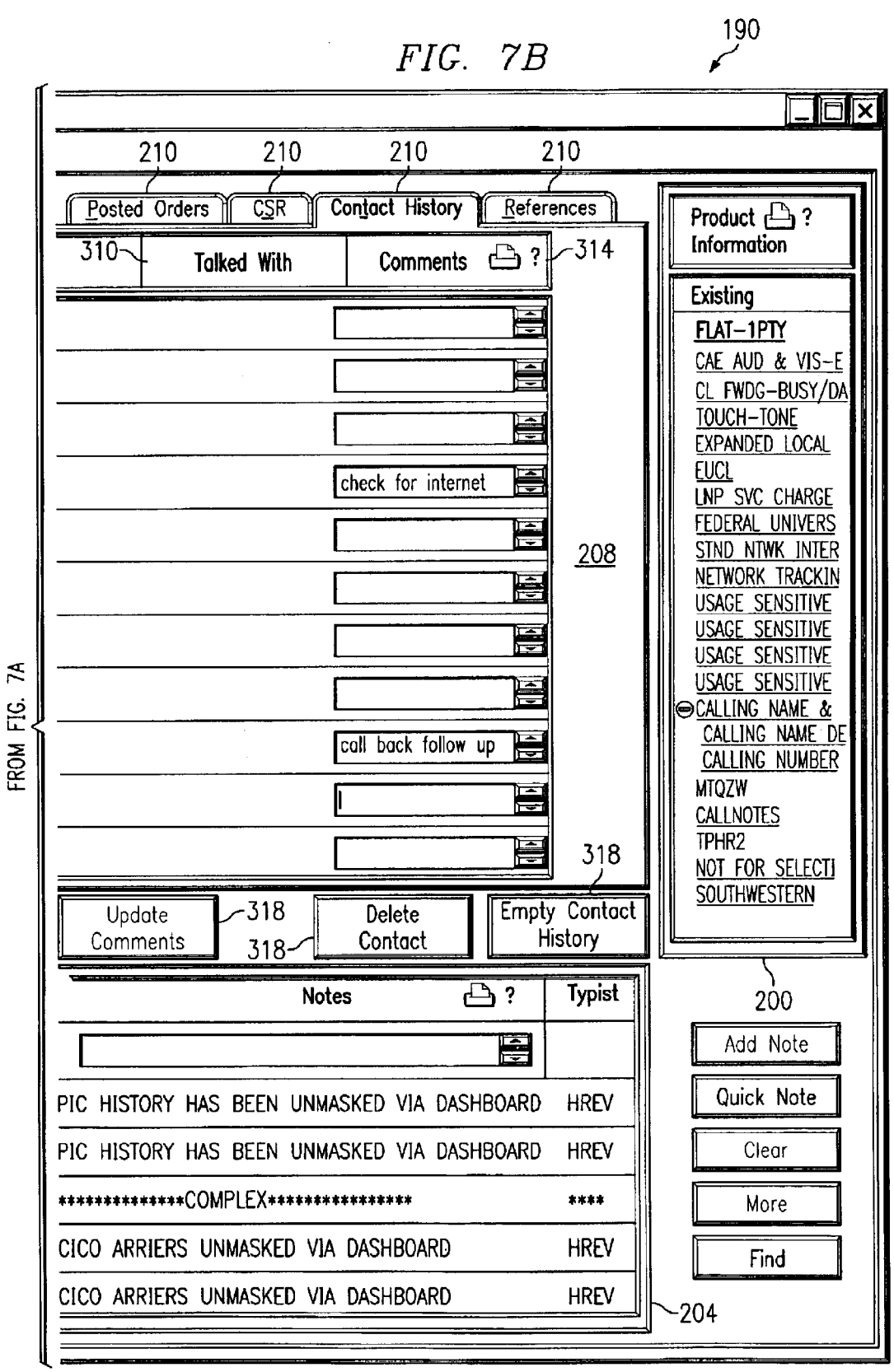

FIGS. 7A and 7B are schematic diagrams illustrating one embodiment of layout 190. In FIGS. 7A and 7B, window 208 of layout 190 shows a portion of transaction information concerning the history of contacts with customer 14, which is identified as "Contact History" by one of tabs 210. In one embodiment, window 208 displays a column 300 of dates on which contacts with customer 14 were made. In one embodiment, window 208 also displays a column 304 of times at which contacts with customer 14 were made. Window 208 may also display a column 308 of the various telephone numbers from which the contacts with customer 14 were made. A column 310 may also be displayed by window 208 to list the identities of CSRs 18 who made the contacts with customer 14. A column 314 is an area in which comments may be entered by CSRs 18 regarding the contacts. More, less, or other types of contact history information may be displayed in a different arrangement within window 208, in some embodiments. In some embodiments, window 208 may also display links 318 that allow CSR 18 to perform particular functions regarding contact history. For example, using links 318, CSR 18 may perform actions such as updating comments, updating contacts, emptying the contact history, deleting a particular contact history, or other functions. The history of contacts may be displayed in other ways. For example, the call dates may be arranged in a row rather than in a column 300.

Figure 8A:
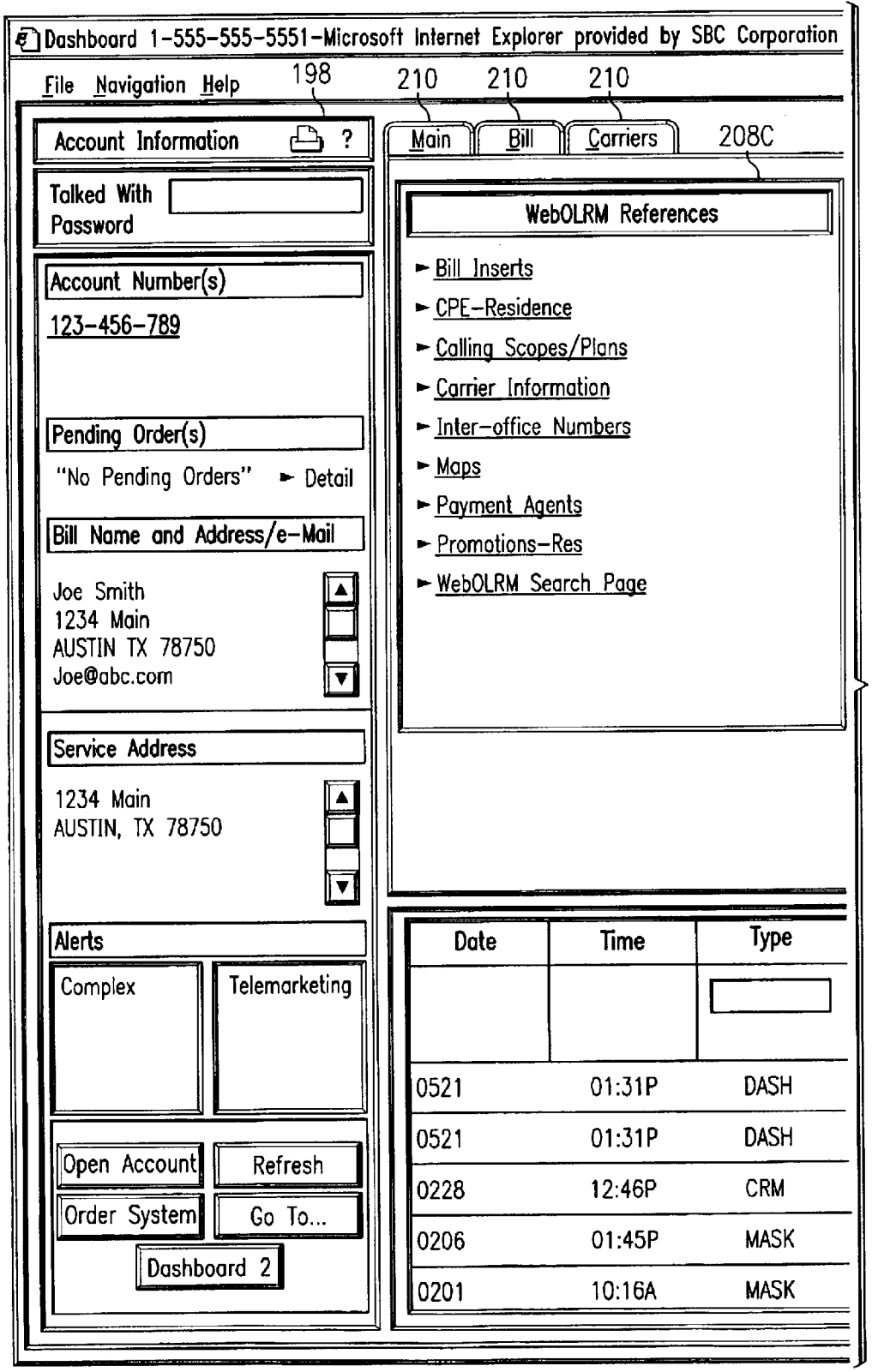
FIGS. 8A and 8B are schematic diagrams illustrating one embodiment of the single layout of FIG. 4 displaying reference information and reference links.
Figure 8B:
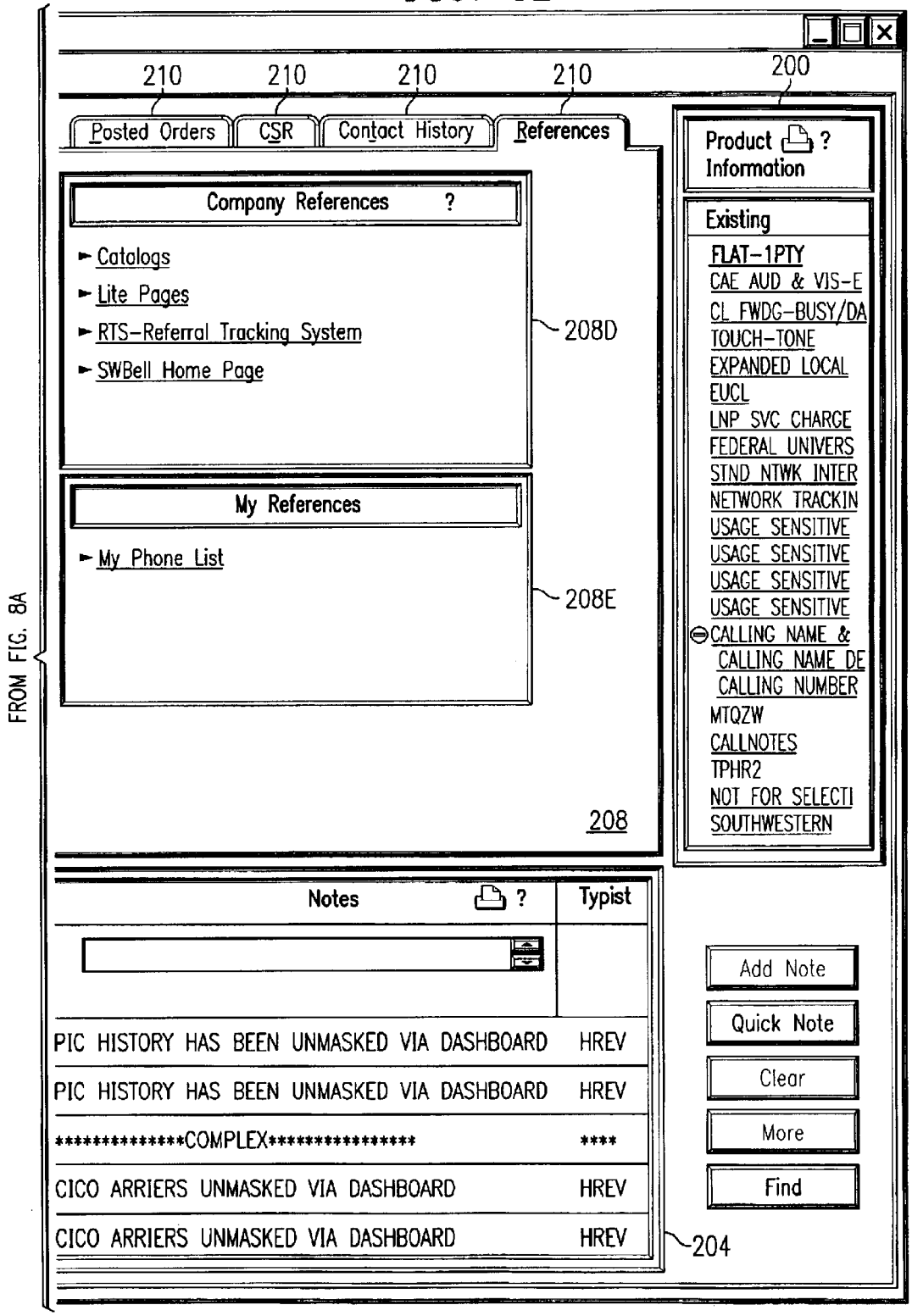

FIGS. 8A and 8B are schematic diagrams of one embodiment of layout 190. FIGS. 8A and 8B show window 208 that is displaying links to references that may be helpful for CSRs 18 (categorized as "References," as identified by one of tabs 210). For example, in one embodiment, window 208 displays sub-categories of references in sub-windows 208C, 208D, and 208E. As shown in sub-window 208C, references may include links to information on how to accomplish certain tasks (shown as "Bill Inserts", for example), explanation of calling plans and scopes (shown as "Calling Scopes/Plans"), information on communication service providers (shown as "Carrier Information"), maps, certain promotions, and phone numbers to other helpful information. Sub-window 208D may comprise links to other categories of reference information, as shown in sub-window 208D. In one embodiment, sub-window 208E may be used to display those links that are frequently used by a particular CSR 18. When the particular CSR 18 logs in, program 158 is operable to identify the frequently used reference links of the logged-in CSR 18. Then program 158 is operable to display those identified links within sub-window 208E. In one embodiment, CSR 18 may insert frequently used references into sub-window 208E. For example, the link shown as "My Phone List" in sub-window 208E may comprise phone numbers that the logged-in CSR 18 frequently uses. Window 208 and sub-windows 208C through 208E may comprise more, less or other reference information that may be arranged differently within window 208, in some embodiments.

Figure 9A:
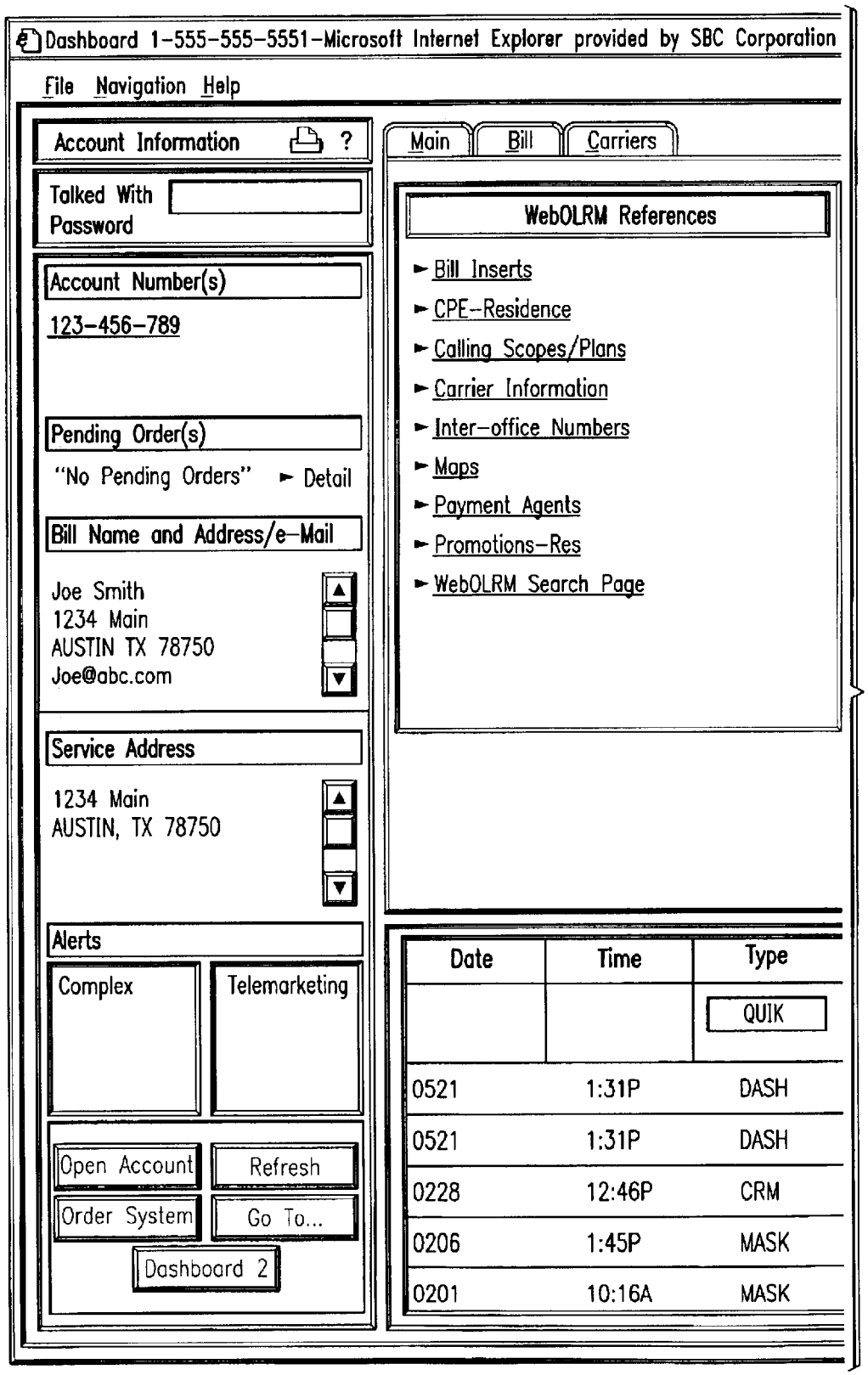
FIGS. 9A and 9B are schematic diagrams illustrating one embodiment of the single layout of FIG. 4 displaying a pop-up window associated with an identified product.
Figure 9B:
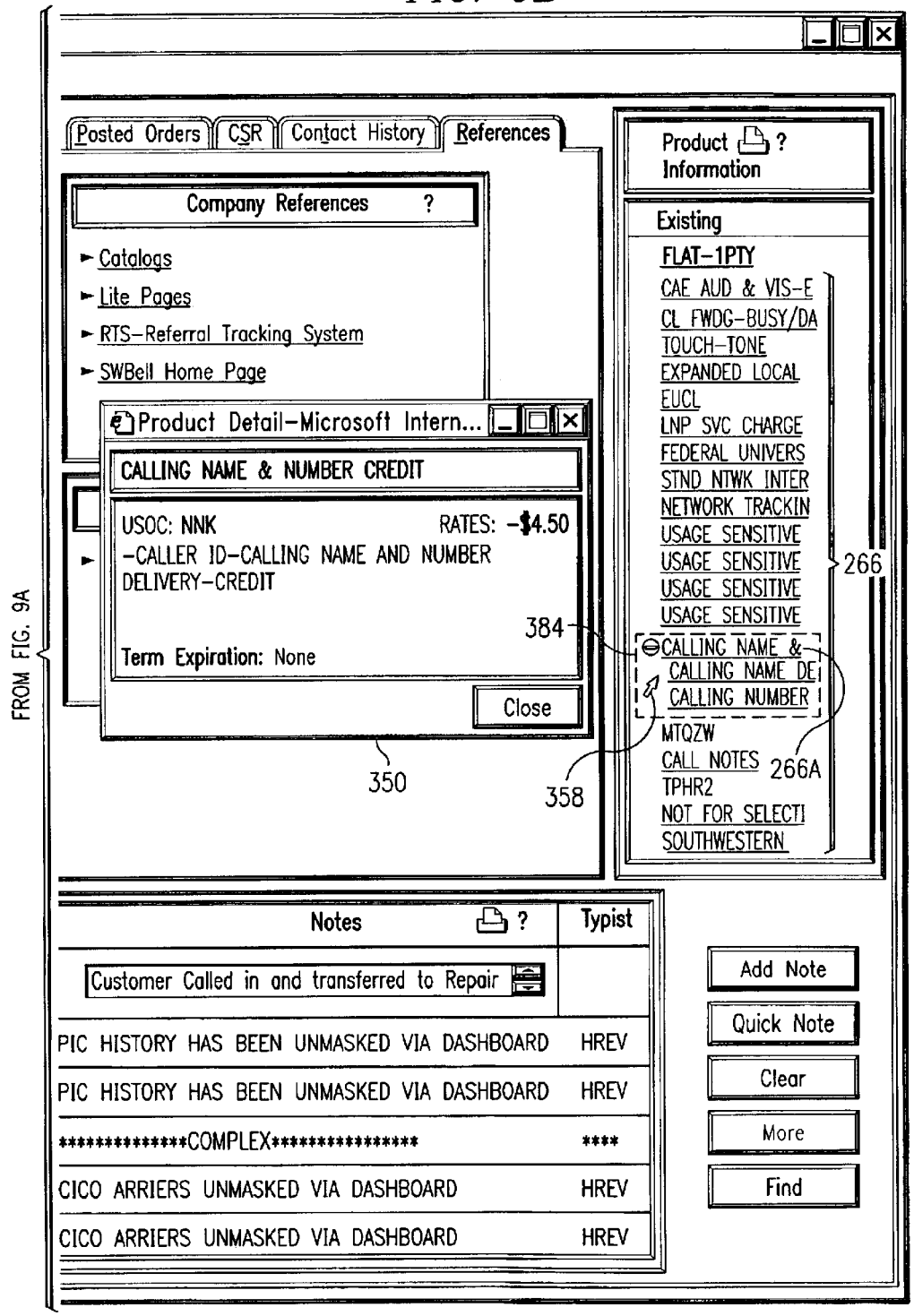

FIGS. 9A and 9B illustrate an embodiment of a pop-up window 350 that may be displayed when CSR 18 selects a particular identified product 266, such as "caller ID" 266A, using a pointer 358 that is controlled using input device 52. For example, as shown in FIG. 9B, an identity 266 of a product may be selected using pointer 358. The selection may occur by simply placing pointer 358 within a selection area 384 that is shown by a phantom box. The selection may occur also when CSR 18 clicks input device 52 while pointer 358 is within a selection area 384. Once an identity 266 of a product is selected, pop-up window 350 is displayed which shows the identity of the product in plain English, any pertinent description and pricing information that may be associated with the product and any term expiration information. However, pop-up window 350 may include more, less, or other relevant information that are arranged differently. In some embodiments, program 158 may be operable to display information associated with identified products by using flags, tags, or other suitable methods.

Although some embodiments of the present invention have been described in detail, it should be understood that various changes, substitutions, and alterations can be made hereto without departing from the spirit and scope of the invention as defined by the appended claims.

What is claimed is:

1. The method for displaying information for a customer service representative rendering services for a plurality of customers, comprising:

grouping identity information of a particular one of the customers into an identity information section;

grouping the respective identities of one or more products associated with the particular one of the customers into a product information section;

providing a notes section operable to display one or more notes;

identifying a plurality of categories of transaction information associated with the particular one of the customers, each one of the categories identified in a corresponding one of the plurality of tabs, each of the tabs, when selected, operable to initiate a display of a corresponding identified one of the categories of transaction information through a window, wherein one of the categories includes a first portion of transaction information concerning a long distance telephone service provider of the particular one of the customer, the first portion of the transaction information comprising the identity of the long distance telephone service provider, a date that the particular one of the customers selected the long distance telephone service provider, and a link operable to, when selected, initiate a display of one or more previous long distance telephone service providers that served the particular one of the customers, and another one of the categories includes a second portion of transaction information concerning a history of contacts with the particular one of the customers, the second portion of the transaction information comprising a date column for one or more contact dates and a time column for corresponding one or more contact times; and displaying, on a same single layout, the identity information section, the product information section, the notes section, the plurality of tabs, and the window.

2. A system for displaying information for a customer service representative rendering services for a plurality of customers, comprising:
a computer system having a display unit, an input device, and a processor;
a computer readable medium coupled to the computer system, the computer readable medium comprising a program operable to be executed on the processor and to:
group identity information of a particular one of the customers into an identity information section;
group the respective identities of one or more products associated with the particular one of the customers into a product information section;
provide a notes section operable to display one or more notes;
identify a plurality of categories of transaction information associated with the particular one of the customers, each one of the categories identified in a corresponding one of a plurality of tabs, each of the tabs, when selected, operable to initiate a display of a corresponding identified one of the categories of transaction information through a window and wherein one of the plurality of categories comprises transaction information concerning billing summary information, customer proprietary network information, an identity of a local telephone service provider, and an identity of a long distance telephone service provider; and
display, through the display unit and on a same single layout, the identity information section, the product information section, the notes section, the plurality of tabs, and the window.

3. The system of claim 2, wherein the notes section comprises one or more notes concerning the particular one of the customers, each one of the notes associated with a corresponding time and a corresponding date.

4. The system of claim 2, wherein the program is operable to display by displaying the plurality of tabs at the top of the same single layout, the window below the plurality of tabs, and the customer information and the product information section at the respective sides of the same single layout.

5. The system of claim 2, wherein the program is operable to display by displaying the same single layout using an internet browser.

6. The system of claim 2, wherein the identity information section comprises a billing name and a billing address of the particular one of the customers.

7. The system of claim 2, wherein a first one of the categories comprises transaction information concerning a long distance telephone service provider of the particular one of the customers, a second one of the categories comprises transaction information concerning one or more pending orders associated with the particular one of the customers, and a third one of the categories comprises transaction information concerning history of contacts with the particular one of the customers.

8. The system of claim 2, wherein one of the plurality of categories comprises a portion of the transaction information concerning a long distance telephone service provider of the particular one of the customer, the portion of the transaction information comprising the identity of the long distance telephone service provider, a date that the particular one of the customers selected the long distance telephone service provider, and a link operable to, when selected, initiate a display of one or more previous long distance telephone service providers that served the particular one of the customers.

9. The system of claim 2, wherein one of the plurality of categories comprises a portion of the transaction information that concerns a history of contacts with the particular one of the customers, the portion of the transaction information comprising a date column for one or more contact dates and a time column for corresponding one or more contact times.

10. The system of claim 2, wherein the program is further operable to display, through the display unit and the window, a plurality of links to a corresponding plurality of categories of reference information, each of the links, when selected, operable to initiate a display of a particular one of the categories of the reference information, wherein the reference information is identified by a reference tab that is displayed in the vicinity of the plurality of tabs.

11. The system of claim 10, wherein one of the links is associated with a particular one of the categories of the reference information concerning one or more long distance telephone service providers.

12. The system of claim 10, wherein one of the links is associated with a particular one of the categories of the reference information concerning one or more promotions.

13. The system of claim 10, wherein one of the links is associated with a particular one of the categories of the reference information concerning one or more calling plans.

14. The system of claim 2, wherein a particular pop-up screen is associated with each of the respective identities of the one or more products, and wherein the program is further operable to initiate a display of the particular pop-up screen when a cursor directed by the input device is positioned at a corresponding one of the respective identities.

15. A system for displaying information for a customer service representative rendering services for a plurality of customers, comprising:
a computer system having a display unit, an input device, and a processor;
a computer readable medium coupled to the computer system, the computer readable medium comprising a program operable to be executed on the processor and to:
group identity information of a particular one of the customers into an identity information section;
group the respective identities of one or more products associated with the particular one of the customers into a product information section;
identify a portion of transaction information concerning a long distance telephone service provider associated with the particular one of the customers as a particular category, the particular category identified by a corresponding tab, the corresponding tab, when selected, operable to initiate a display of the portion of the transaction information through a window, the portion of the transaction information comprising the identity of the long distance telephone service provider; and
display, through the display unit and on a same single layout, the identity information section, the product information section, the tab, and the window.

16. The system of claim 15, wherein the portion of the transaction information further comprises a date that the particular one of the customers selected the long distance telephone service provider.

17. The system of claim 15, wherein the program is further operable to display a link through the window, the link, when selected, operable to initiate a display of one or more previous long distance telephone service providers that served the particular one of the customers.

18. The method for displaying information for a customer service representative rendering services for a plurality of customers, comprising:

grouping identity information of a particular one of the customers into an identity information section;

grouping the respective identities of one or more products associated with the particular one of the customers into a product information section;

providing a notes section operable to display one or more notes;

identifying a plurality of categories of transaction information associated with the particular one of the customers, each one of the categories identified in a corresponding one of the plurality of tabs, each of the tabs, when selected, operable to initiate a display of a corresponding identified one of the categories of transaction information through a window;

identifying one of the categories that includes a portion of transaction information concerning a long distance telephone service provider of the particular one of the customer, the portion of the transaction information comprising the identity of the long distance telephone service provider, a date that the particular one of the customers selected the long distance telephone service provider, and a link operable to, when selected, initiate a display of one or more previous long distance telephone service providers that served the particular one of the customers: and displaying, on a same single layout, the identity information section, the product information section, the notes section, the plurality of tabs, and the window.

19. The method of claim 18, wherein the notes section comprises one or more notes concerning the particular one of the customers, each one of the notes associated with a corresponding time and a corresponding date.

20. The method of claim 18, wherein displaying comprises displaying the plurality of tabs at the top of the same single layout, displaying the window below the plurality of tabs, and displaying the customer information and the product information section at the respective sides of the same single layout.

21. The method of claim 18, wherein displaying comprises displaying the same single layout through an internet browser.

22. The method of claim 18, wherein transaction information includes information concerning contact history and a communications service provider, and wherein identifying comprises identifying the information concerning the contact history and the communications service provider as two separate categories that are respectively identified by two of the plurality of tabs.

23. The method of claim 18, wherein identifying a plurality of categories comprises identifying one of the categories that includes a portion of transaction information concerning a history of contacts with the particular one of the customers, the portion of the transaction information comprising a date column for one or more contact dates and a time column for corresponding one or more contact times.

24. The method of claim 18, and further comprising:

displaying, through the window, a plurality of links to a corresponding plurality of categories of reference information, each of the links, when selected, operable to initiate a display of a particular one of the categories of the reference information, wherein the reference information is identified by a reference tab; and displaying the reference tab in the vicinity of the plurality of tabs.

25. A system for displaying information for a customer service representative rendering services for a plurality of customers, comprising:

a computer system having a display unit, an input device, and a processor;

a computer readable medium coupled to the computer system, the computer readable medium comprising a program operable to be executed on the processor and to:

group identity information of a particular one of the customers into an identity information section;

group the respective identities of one or more products associated with the particular one of the customers into a product information section;

provide a notes section operable to display one or more notes;

identify a plurality of categories of transaction information associated with the particular one of the customers, each one of the categories identified in a corresponding one of a plurality of tabs, each of the tabs, when selected, operable to initiate a display of a corresponding identified one of the categories of transaction information through a window and wherein a first one of the categories comprises transaction information concerning a long distance telephone service provider of the particular one of the customers, a second one of the categories comprises transaction information concerning one or more pending orders associated with the particular one of the customers, and a third one of the categories comprises transaction information concerning history of contacts with the particular one of the customers; and display, through the display unit and on a same single layout, the identity information section, the product information section, the notes section, the plurality of tabs, and the window.

26. The system of claim 25, wherein the notes section comprises one or more notes concerning the particular one of the customers, each one of the notes associated with a corresponding time and a corresponding date.

27. The system of claim 25, wherein the program is operable to display by displaying the plurality of tabs at the top of the same single layout, the window below the plurality of tabs, and the customer information and the product information section at the respective sides of the same single layout.

28. The system of claim 25, wherein the program is operable to display by displaying the same single layout using an internet browser.

29. The system of claim 25, wherein one of the plurality of categories comprises transaction information concerning billing summary information, customer proprietary network information, an identity of a local telephone service provider, and an identity of a long distance telephone service provider.

30. The system of claim 25, wherein the identity information section comprises a billing name and a billing address of the particular one of the customers.

31. The system of claim 25, wherein one of the plurality of categories comprises a portion of the transaction information concerning a long distance telephone service provider of the particular one of the customer, the portion of the transaction information comprising the identity of the long distance telephone service provider, a date that the particular one of the customers selected the long distance telephone service provider, and a link operable to, when selected, initiate a display of one or more previous long distance telephone service providers that served the particular one of the customers.

32. The system of claim 25, wherein one of the plurality of categories comprises a portion of the transaction information that concerns a history of contacts with the particular one of the customers, the portion of the transaction information comprising a date column for one or more contact dates and a time column for corresponding one or more contact times.

33. The system of claim 25, wherein the program is further operable to display, through the display unit and the window, a plurality of links to a corresponding plurality of categories of reference information, each of the links, when selected, operable to initiate a display of a particular one of the categories of the reference information, wherein the reference information is identified by a reference tab that is displayed in the vicinity of the plurality of tabs.

34. The system of claim 33, wherein one of the links is associated with a particular one of the categories of the reference information concerning one or more long distance telephone service providers.

35. The system of claim 33, wherein one of the links is associated with a particular one of the categories of the reference information concerning one or more promotions.

36. The system of claim 33, wherein one of the links is associated with a particular one of the categories of the reference information concerning one or more calling plans.

37. The system of claim 25, wherein a particular pop-up screen is associated with each of the respective identities of the one or more products, and wherein the program is further operable to initiate a display of the particular pop-up screen when a cursor directed by the input device is positioned at a corresponding one of the respective identities.

38. A system for displaying information for a customer service representative rendering services for a plurality of customers, comprising:
  computer system having a display unit, an input device, and a processor;
  a computer readable medium coupled to the computer system, the computer readable medium comprising a program operable to be executed on the processor and to:
    group identity information of a particular one of the customers into an identity information section;
    group the respective identities of one or more products associated with the particular one of the customers into a product information section;
    provide a notes section operable to display one or more notes;
    identify a plurality of categories of transaction information associated with the particular one of the customers, each one of the categories identified in a corresponding one of a plurality of tabs, each of the tabs, when selected, operable to initiate a display of a corresponding identified one of the categories of transaction information through a window and wherein one of the plurality of categories comprises a portion of the transaction information concerning a long distance telephone service provider of the particular one of the customer, the portion of the transaction information comprising the identity of the long distance telephone service provider, a date that the particular one of the customers selected the long distance telephone service provider, and a link operable to, when selected, initiate a display of one or more previous long distance telephone service providers that served the particular one of the customers; and
    display, through the display unit and on a same single layout, the identity information section, the product information section, the notes section, the plurality of tabs, and the window.

39. The system of claim 38, wherein the notes section comprises one or more notes concerning the particular one of the customers, each one of the notes associated with a corresponding time and a corresponding date.

40. The system of claim 38, wherein the program is operable to display by displaying the plurality of tabs at the top of the same single layout, the window below the plurality of tabs, and the customer information and the product information section at the respective sides of the same single layout.

41. The system of claim 38, wherein the program is operable to display by displaying the same single layout using an internet browser.

42. The system of claim 38, wherein one of the plurality of categories comprises transaction information concerning billing summary information, customer proprietary network information, an identity of a local telephone service provider, and an identity of a long distance telephone service provider.

43. The system of claim 38, wherein the identity information section comprises a billing name and a billing address of the particular one of the customers.

44. The system of claim 38, wherein a first one of the categories comprises transaction information concerning a long distance telephone service provider of the particular one of the customers, a second one of the categories comprises transaction information concerning one or more pending orders associated with the particular one of the customers, and a third one of the categories comprises transaction information concerning history of contacts with the particular one of the customers.

45. The system of claim 38, wherein one of the plurality of categories comprises a portion of the transaction information that concerns a history of contacts with the particular one of the customers, the portion of the transaction information comprising a date column for one or more contact dates and a time column for corresponding one or more contact times.

46. The system of claim 38, wherein the program is further operable to display, through the display unit and the window, a plurality of links to a corresponding plurality of categories of reference information, each of the links, when selected, operable to initiate a display of a particular one of the categories of the reference information, wherein the reference information is identified by a reference tab that is displayed in the vicinity of the plurality of tabs.

47. The system of claim 46, wherein one of the links is associated with a particular one of the categories of the reference information concerning one or more long distance telephone service providers.

48. The system of claim 46, wherein one of the links is associated with a particular one of the categories of the reference information concerning one or more promotions.

49. The system of claim 46, wherein one of the links is associated with a particular one of the categories of the reference information concerning one or more calling plans.

50. The system of claim 38, wherein a particular pop-up screen is associated with each of the respective identities of the one or more products, and wherein the program is further operable to initiate a display of the particular pop-up screen when a cursor directed by the input device is positioned at a corresponding one of the respective identities.

51. A system for displaying information for a customer service representative rendering services for a plurality of customers, comprising:

a computer system having a display unit, an input device, and a processor;

a computer readable medium coupled to the computer system, the computer readable medium comprising a program operable to be executed on the processor and to:

group identity information of a particular one of the customers into an identity information section;

group the respective identities of one or more products associated with the particular one of the customers into a product information section;

provide a notes section operable to display one or more notes;

identify a plurality of categories of transaction information associated with the particular one of the customers, each one of the categories identified in a corresponding one of a plurality of tabs, each of the tabs, when selected, operable to initiate a display of a corresponding identified one of the categories of transaction information through a window;

display, through the display unit and on a same single layout, the identity information section, the product information section, the notes section, the plurality of tabs, and the window;

display, through the display unit and the window, a plurality of links to a corresponding plurality of categories of reference information, each of the links, when selected, operable to initiate a display of a particular one of the categories of the reference information, wherein the reference information is identified by a reference tab that is displayed in the vicinity of the plurality of tabs; and wherein one of the links is associated with a particular one of the categories of the reference information concerning one or more calling plans.

52. The system of claim 51, wherein the notes section comprises one or more notes concerning the particular one of the customers, each one of the notes associated with a corresponding time and a corresponding date.

53. The system of claim 51, wherein the program is operable to display by displaying the plurality of tabs at the top of the same single layout, the window below the plurality of tabs, and the customer information and the product information section at the respective sides of the same single layout.

54. The system of claim 51, wherein the program is operable to display by displaying the same single layout using an internet browser.

55. The system of claim 51, wherein one of the plurality of categories comprises transaction information concerning billing summary information, customer proprietary network information, an identity of a local telephone service provider, and an identity of a long distance telephone service provider.

56. The system of claim 51, wherein the identity information section comprises a billing name and a billing address of the particular one of the customers.

57. The system of claim 51, wherein a first one of the categories comprises transaction information concerning a long distance telephone service provider of the particular one of the customers, a second one of the categories comprises transaction information concerning one or more pending orders associated with the particular one of the customers, and a third one of the categories comprises transaction information concerning history of contacts with the particular one of the customers.

58. The system of claim 51, wherein one of the plurality of categories comprises a portion of the transaction information concerning a long distance telephone service provider of the particular one of the customer, the portion of the transaction information comprising the identity of the long distance telephone service provider, a date that the particular one of the customers selected the long distance telephone service provider, and a link operable to, when selected, initiate a display of one or more previous long distance telephone service providers that served the particular one of the customers.

59. The system of claim 51, wherein one of the plurality of categories comprises a portion of the transaction information that concerns a history of contacts with the particular one of the customers, the portion of the transaction information comprising a date column for one or more contact dates and a time column for corresponding one or more contact times.

60. The system of claim 51, wherein one of the links is associated with a particular one of the categories of the reference information concerning one or more long distance telephone service providers.

61. The system of claim 51, wherein one of the links is associated with a particular one of the categories of the reference information concerning one or more promotions.

62. The system of claim 51, wherein a particular pop-up screen is associated with each of the respective identities of the one or more products, and wherein the program is further operable to initiate a display of the particular pop-up screen when a cursor directed by the input device is positioned at a corresponding one of the respective identities.

* * * * *